United States Patent Office 3,816,554
Patented June 11, 1974

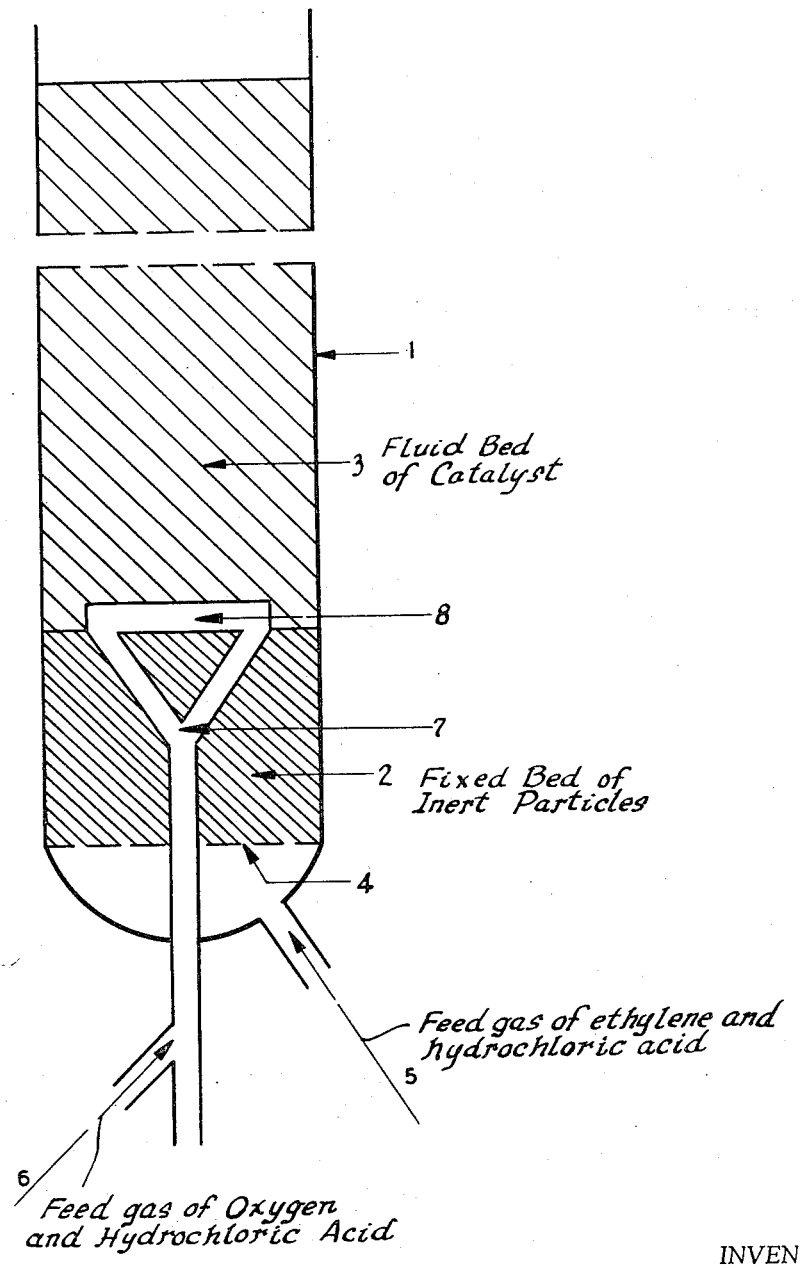

3,816,554
PROCESS FOR THE MANUFACTURE OF DICHLOROETHANE
Cesare Reni, Varese, Luigi Lugo, Milan, and Giorgio Gualdi, Varese, Italy, assignors to Societá Italiana Resine S.p.A., Milan, Italy
Filed Oct. 22, 1970, Ser. No. 83,047
Claims priority, application Italy, Nov. 14, 1969, 24,406/69
Int. Cl. C07c 17/02
U.S. Cl. 260—659 A                8 Claims

ABSTRACT OF THE DISCLOSURE

In a reactor of length-to-diameter ratio of at least 3:1 a bottom zone comprises a fixed bed of solid inert particles, while a top zone comprises a fluidizeable bed of supported catalyst; a first gaseous stream comprising ethylene and hydrogen chloride and a second gaseous stream comprising molecular oxygen and hydrogen chloride are fed in preheated condition through their respective beds in an amount keeping the catalytic bed in fluidized condition.

---

The invention relates to the manufacture of dichloroethane by oxychlorination of ethylene. More precisely, the invention relates to those processes in which the ethylene is passed together with hydrochloric acid and oxygen over catalysts of the Deacon type.

Dichloroethane is a very important compound in industry in that, in addition to being a solvent, it is used in the manufacture of insecticides, ethylene diamine and vinyl chloride.

Dichloroethane can be produced by reaction of ethylene with chlorine or, according to a more recent process, by oxychlorination of ethylene. Oxychlorination is understood as being a chlorination reaction whereby the organic compound to be chlorinated is caused to react with hydrochloric acid in the presence of oxygen or gases containing molecular oxygen, the reagents being passed over catalysts consisting of salts and particularly halides of metals of variable valency.

Particularly useful for the purpose is cupric chloride, normally used in combination with other salts such as for example potassium, lithium, lanthanum, cobalt and thorium chlorides.

Such catalytic salts are used in the process of oxychlorination in a form supported on solid and inert material and in industrial practice, the organic substance to be chlorinated, the hydrochloric acid and the oxidising gas are supplied to the catalytic bed in fixed or fluidised form.

When the fixed bed techniques are used, there are various disadvantages mainly due to the difficulty in controlling the temperature.

Furthermore, the known fluidised bed embodiments, although allowing better temperature control, are not completely without drawbacks, particularly low conversion rates and the formation of relatively large quantities of byproducts.

It is considered that the formation of byproducts is encouraged by the difficulties inherent in rapid and effective homogenisation of the gaseous reagent supplied in a plurality of independent flows to the oxychlorination reactor.

It should be noted that homogenising the gaseous reagents before passing them over the catalyst is not advisable in that explosive mixtures may form between the oxygen and the ethylene.

An object of the present invention is a process for the oxychlorination of ethylene which allows dichloroethane to be obtained with a high selectivity even at high ethylene conversion rates.

A further object of the present invention is a process for the manufacture of dichloroethane by oxychlorination of ethylene which eliminates the risk of explosive mixtures forming between the ethylene and the oxygen.

The process of the present invention substantially consists in bringing a preheated gaseous stream of ethylene and a preheated gaseous stream of oxygen into contact in a catalytic bed, the two reagents mentioned being diluted by means of hydrochloric acid gas, supply being carried out at two different points in the reactor.

More precisely, the process of the present invention consists in establishing, in a reactor of elongated tubular form, a bottom zone consisting of a fixed bed of solid and inert particles and an upper zone consisting of a supported catalyst in the form of solid, fine particles, one of the gas streams being supplied at the base of the zone consisting of solid and inert particles, the other gas stream being supplied at the base of the zone which consists of particles of catalyst, the total quantity of gas supplied being such as to maintain the catalytic particles in fluidised form.

The term "reactors of elongated tubular form" is intended to imply that such reactors have a height:diameter ratio in excess of 3:1.

In carrying out the objects of the present invention, the substances known as decolourising earths, such as for example diatomaceous earths or fuller's earth or kieselguhr in the form of particles with a granular range of 30 to 100 mesh are used as supports for the catalysts.

The catalyst may be a cupric salt and particularly cupric chloride, especially in combination with a salt, particularly a chloride, of an alkali metal and/or rare earths.

The quantities of support material and of copper salt are preferably regulated so that the metal content is between 5% and 20% by weight of the finished catalyst.

The salts of the alkali metals or rare earths, and particularly the chlorides of lithium and potassium, are added up to 10% by weight calculated as metals, still calculated on the finished catalyst.

The preparation of the catalyst may be carried out by cold impregnation of the support, using aqueous solutions of the copper salts and of the salts of the other elements which it is intended to add, the impregnated support then being dried. Alternatively, the support may be impregnated hot by means of a solution of catalytic salts so as to produce drying at the same time. In order to provide the fixed bed in the bottom of the reactor, the same catalyst support may be used, in non-impregnated form, or some other material inert under the conditions in which the work is performed, for example in granules of a size such as not to result in fluidisation under the conditions of reaction.

It is also possible to interpose a filter or partition between the inert fixed bed and the catalytic fluid bed. It has been found that optimum results are obtained when the height of the fixed bed is maintained at between 0.05 and 0.3 times the height of the fluidised catalytic bed.

In achieving the objects of the present invention, two gaseous streams are fed to the reactor, the said streams consisting respectively of ethylene diluted by hydrochloric acid gas and oxygen diluted by hydrochloric acid gas.

In particular, as one stream of gas is supplied to the base of the fixed bed consisting of the inert particles while the second stream is supplied to the base of the bed which consists of the fine particles of supported catalyst.

The objects of the present invention are achieved when 50% to 90% of the hydrochloric acid is supplied with the ethylene, the remaining fraction of the volume being supplied with the oxygen.

There are no substantial variations in results when the fraction containing the oxygen is supplied to the foot of the fixed bed constituted by the inert particles and the fraction containing the ethylene is supplied to the foot of the bed consisting of particles of catalyst, or vice versa.

It has been found that the best conditions of reaction are obtained by maintaining molar ratios of ethylene to hydrochloric acid of 1:1.7 to 1:2.3 and molar ratios of hydrochloric acid to oxygen of 3:1 to 4:1, the streams being preheated before being supplied to the reactor at temperature of 100 to 150° C., and the conditions being regulated so that the ethylene reacts at temperatures between 280 and 330° C.

As has been previously stated, oxygen is preferably used as an oxidising gas. It is also possible to use gases with a high oxygen content such as for example contents in excess of 90%.

It is possible to work at pressures ranging from ambient pressure up to a few atmospheres, with the gases being supplied at a velocity and in amounts sufficient to maintain the particles of supported catalyst in fluid form. It is furthermore recommended to work with a gas contact time of between 1 and 20 seconds.

By working under the conditions described, rapid and uniform homogenisation of the gaseous reagents in the reactor can be achieved, and it is possible to form dichloroethane with a high rate of ethylene conversion, the selectivity of the reaction being maintained at a high level.

Furthermore, the possibility of explosive mixtures forming between the ethylene and the oxygen is completely avoided.

The accompanying drawing diagrammatically illustrates a form of apparatus suitable for carrying out the purposes of the present invention.

In the figure, reference numeral 1 denotes a reactor of elongated tubular form. At the bottom of the reactor, reference numeral 2 indicates the fixed bed consisting of inert particles, supported by a grille or perforated plate 4. Reference numeral 3 indicates the fluid bed consisting of the fine particles of catalyst.

It is also possible to provide at the foot of the reactor a pipe for discharging the catalyst, the top end being situated at the height of the surface of contact between the fluid bed and the fixed bed. This feature is not shown in the drawing.

Again referring to FIG. 1, a preheated stream of gas is supplied through a pipe 5 to the base of the inert and fixed bed, the other gas stream being first preheated and then supplied through a pipe 6 to a distributor 7. In particular, this latter supply occurs at the foot of the bed of catalytic particles in fluid form. The top part of the distributor 7 preferably consists of a perforated ring 8.

Not shown in the drawing are the preheaters for the streams of gas.

Worthy of particular note is the construction of the distributor which makes it possible to avoid accumulation of particles of catalyst in the gas supply tubes.

Finally, the temperature of reaction may be regulated by means of heat exchanger fluids circulating in an outer jacket enclosing the tubular reactor with or without cooling coils located within the fluid catalytic bed, or such coils may be used alone.

The following example illustrates the invention.

EXAMPLE

The decolourising earth known by the brand name Florex, having a granular range of 30 to 90 mesh, is impregnated with an aqueous solution containing 30 g. dehydrated cupric chloride and 15.5 g. potassium chloride for every 100 ml. of solution. After drying, a granular catalyst is obtained which contains 8% by weight of copper and 5.5% by weight of potassium, both expressed as metals. In the oxychlorination reaction, a metal reactor of elongated tubular form is used, of the type described in FIG. 1.

More precisely, the reactor has a radius of 15 cm. and on the perforated bottom plate are placed small glass balls having a diameter of 4 to 5 mm. to a height of 30 cm.

200 kg. of the catalyst, preparation of which has been previously described, are placed on top of the fixed bed.

Through the supply pipe 5, 50 normal cubic metres per hour of a preheated gaseous mixture at 140° C., consisting of ethylene 44% by volume and hydrochloric acid gas 56% by volume are supplied to the foot of the fixed inert bed. At the foot of the bed of catalytic particles, there are supplied 25 normal cubic metres per hour of a gaseous mixture preheated to 120° C. and consisting of 44% by volume of oxygen and 56% by volume of hydrochloric acid gas. This latter supply is made through the pipe 6 into the distributor 7 and the gas emerges from the perforated ring 8 situated at the foot of the bed of catalytic particles.

By means of a heat exchanger fluid situated externally of the reactor, the temperature in the reaction zone is regulated to approx. 300° C., while the pressure in the reactor is 1.5 atmospheres.

A gaseous mixture is discharged from the reactor, being cooled to separate the normally liquid products.

When working under the conditions described, the ethylene supplied is converted at a percentage rate of 91.3% by moles, to give approx. 64 kg./hr. of dichloroethane.

We claim:

1. A process for the manufacture of dichloroethane by oxychlorination of ethylene with molecular oxygen and hydrochloric acid gas in the presence of a supported catalyst containing cupric chloride characterised in that:
 (i) in a reactor of length to diameter ratio of at least 3:1 there are established a bottom zone consisting of a fixed bed of solid, inert particles and a top zone consisting of a bed of the supported catalyst in the form of fine, solid particles;
 (ii) there is established a first gaseous stream containing ethylene and hydrochloric acid gas;
 (iii) there is established a second gas stream containing molecular oxygen and hydrochloric acid gas;
 (iv) one of the said gas streams, after being preheated, is fed to the bottom of the fixed bed;
 (v) the other gas stream, after being preheated, is fed to the bottom of the bed of catalytic particles;
 (vi) the velocities and amounts of the gaseous streams on entry are maintained at levels such as to maintain the bed of catalytic particles in a fluidised state;
 (vii) a gas stream containing dichloroethane produced from the ethylene is withdrawn from the reactor and the dichloroethane is separated from it.

2. A process according to claim 1, carried out at temperatures of 280 to 330° C. and at pressures ranging from atmospheric pressure up to a few atmospheres above atmospheric pressure.

3. A process according to claim 1, characterised in that the height of the fixed bed of solid, inert particles is maintained at 0.05 to 0.3 times the height of the bed of fluidised catalytic particles.

4. A process according to claim 1, characterised in that 50% to 90% of the hydrochloric acid gas is supplied with the ethylene, the remaining part of the volume being supplied with the oxygen.

5. A process according to claim 1, characterised in that the two streams of preheated gas are supplied at temperatures of 100 to 150° C.

6. A process according to claim 1, characterised in that the molar ratio of ethylene to hydrochloric acid is 1:1.7 to 1:2.3 and the molar ratio of hydrochloric acid to oxygen is 3:1 to 4:1.

7. A process according to claim 1, characterised in that the catalyst contains cupric chloride in combination with the chloride of lithium or potassium, the copper expressed as metal forming 5% to 20% by weight of the catalyst, and the alkali metal forming up to 10% by weight of the catalyst.

8. The process of claim 1, wherein an alkali metal chloride and/or a rare earth metal chloride is employed in combination with said catalyst containing cupric chloride.

References Cited
UNITED STATES PATENTS

| | | | |
|---|---|---|---|
| 3,579,597 | 5/1971 | Antonini et al. | 260—659 AX |
| 3,585,246 | 6/1971 | Van Camp et al. | 260—659 AX |
| 3,488,398 | 1/1970 | Harpring et al. | 260—659 A |
| 3,420,901 | 1/1969 | Schulz | 260—659 A |

LEON ZITVER, Primary Examiner
J. A. BOSKA, Assistant Examiner